United States Patent [19]

Dombroski et al.

[11] 4,355,136

[45] Oct. 19, 1982

[54] SOLVENT-RESISTANT UNSATURATED POLYESTER COMPOSITIONS

[75] Inventors: John R. Dombroski; Fred W. Light, Jr., both of Kingsport, Tenn.

[73] Assignee: Eastman Kodak Company, Rochester, N.Y.

[21] Appl. No.: 337,034

[22] Filed: Jan. 4, 1982

[51] Int. Cl.$^3$ .................. C08G 63/76; C08L 67/00
[52] U.S. Cl. .................................. 525/35; 525/43; 525/63; 525/445; 528/192; 528/303; 528/304; 528/306
[58] Field of Search ............... 525/35, 43, 63, 445; 528/192, 303, 304, 306

[56] References Cited

U.S. PATENT DOCUMENTS 3,655,820  4/1972  Kaupp .............................. 528/306
4,230,817 10/1980  Charbonneau .................. 528/192 X
4,251,641  2/1981  Arakawa et al. ................ 525/445 X
4,294,748 10/1981  Corrado et al. ................. 528/303 X

*Primary Examiner*—Lucille M. Phynes
*Attorney, Agent, or Firm*—John F. Stevens; Daniel B. Reece, III

[57] ABSTRACT

Disclosed are compositions comprising a polyester derived from 100 mole % of an acid component and 100 mole % of a glycol component, the acid component comprising about 30–90 mole % of at least one $\alpha,\beta$-ethylenically unsaturated dicarboxylic acid and about 70–10 mole % of a compound containing a cinnamic acid moiety, and the glycol component comprising at least one saturated aliphatic glycol containing from 2 to 10 carbon atoms. These compositions have improved resistance to attack by organic solvents.

15 Claims, No Drawings

SOLVENT-RESISTANT UNSATURATED POLYESTER COMPOSITIONS

TECHNICAL FIELD

This invention relates to unsaturated polyesters containing the cinnamic acid moiety which, when crosslinked in the usual manner to produce thermosetting compositions, have unexpectedly high resistance to attack by organic solvents.

BACKGROUND ART

Unsaturated polyesters are industrially important materials which have found broad application for the manufacture of automotive parts, boats, appliance parts, furniture, and other such diverse products. Unsaturated polyesters are low molecular weight polymers prepared by the melt phase reaction of a glycol such as ethylene glycol, propylene glycol, neopentyl glycol, and the like; and an unsaturated dicarboxylic acid such as fumaric acid or maleic anhydride. Additionally, other dicarboxylic acids may be used to effect desired properties. For the preparation of the polyester, the glycol, or a blend of glycols, is employed in slight excess of the molar equivalency of the sum of the acid components. The excess glycol is required because of loss of glycol by adventitious decomposition reactions as well as some loss by distillation. When the polyester achieves the appropriate degree of polymerization, the heat is removed and the resin is dissolved in styrene monomer. Styrene serves both as a solvent vehicle for the resin as well as the crosslinking agent. The resin is generally combined with desired amounts of peroxide initiator, fillers, fiberglass reinforcement, and other materials necessary to prepare molding compounds that can be subsequently formed and crosslinked into useful products. Fiberglass reinforced unsaturated polyester compositions generally exhibit a desirable balance of physical properties. However, in the presence of organic solvents, the crosslinked unsaturated polyesters are highly susceptible to vigorous solvent sorption and swelling. The swelling stresses which develop can quickly lead to resin fracture and a severe loss of mechanical properties. For this reason, conventional unsaturated polyester resins are not recommended for the fabrication of pipes and tanks for contact and handling of polar organic solvents. This invention, however, describes a novel composition of matter that can be prepared and processed by conventional methods, but unexpectedly exhibits high resistance to attack by organic solvents.

DISCLOSURE OF INVENTION

According to the present invention, there are provided compositions comprising a polyester derived from 100 mole % of an acid component and 100 mole % of a glycol component, the acid component comprising about 30-90 mole % (preferably about 40-60 mole %) of at least one $\alpha,\beta$-ethylenically unsaturated dicarboxylic acid and about 70-10 mole % (preferably about 60-40 mole %) of a compound containing a cinnamic acid moiety, and the glycol component comprising at least one saturated aliphatic glycol containing from 2 to 10 carbon atoms.

Among the $\alpha,\beta$-ethylenically unsaturated polycarboxylic acids that may be used are those having 2-12 carbon atoms, e.g., maleic, fumaric, substituted fumaric, citraconic, mesaconic, teraconic, glutaconic, muconic, and the like, as well as mixtures thereof. Non-crosslinkable polycarboxylic acids, i.e., those which do not contain polymerizable $\alpha,\beta$-ethylenic unsaturation, may also be used if employed in combination with one or more of the aforementioned $\alpha,\beta$-ethylenically unsaturated polycarboxylic acids. Where such non-crosslinkable polycarboxylic acids are employed, the amount thereof should not constitute more than about 80% of the total equivalents of carboxyl groups in the esterification mixture. Preferably, such noncrosslinkable polycarboxylic acids will be employed in amounts varying between about 35% and 75% of the above indicated equivalence basis. Among the non-crosslinkable polycarboxylic acids that may be used are such as oxalic, malonic, succinic, glutaric, sebacic, adipic, phthalic, isophthalic, terephthalic, substituted phthalic, such as tetrachlorophthalic, suberic, azelaic, tricarballylic, citric, tartaric, cyclopropanedicarboxylic, cyclohexanedicarboxylic, and the like, as well as mixtures thereof.

The compounds containing the cinnamic acid moiety that have been found to be useful in this invention are those of the formula

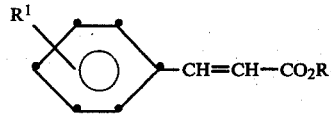

wherein R is hydrogen, phenyl or alkyl having 1 to 12 carbon atoms, $R^1$ is a carboalkoxy or carbophenoxy group having 1 to 12 carbon atoms, or 2-propenoic acid, including the alkyl or phenyl esters having 1 to 12 carbon atoms.

The preferred compounds include

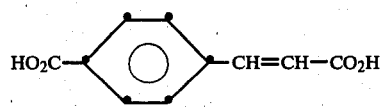

I 4-(2-carboxyethenyl)benzoic acid and

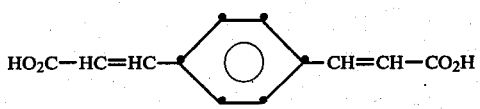

II 3,3'-(1,4-phenylene)bis[2-propenoic acid]

With respect to the saturated aliphatic polyhydric alcohols which may be employed in the preparation of the modified linear alkyds or polyesters, it is preferred that those containing only two hydroxyl groups be used. Among such diols are included ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,4, pentanediol-1,5, hexanediol-1,6, neopentyl glycol, 2,2,4-trimethyl-1,3-pentanediol and the like, as well as mixtures thereof. However, saturated aliphatic polyhydric alcohols containing more than two hydroxyl groups may also be employed. Among such polyols are included glycerol, trimethylol ethane, trimethylol propane, pentaerythritol, sorbitol and the like, as well as mixtures thereof. It is usually desirable that such polyols containing more than two hydroxyl groups be employed in minor proportions relative to the diol or diols used.

The components may be reacted in the manner customarily used in preparing ethylenically unsaturated polyester resins, i.e., at elevated temperatures and atmospheric pressure, although pressures slightly above or below atmospheric may be employed if desired. The reaction temperature is not critical. The preferred temperature will usually be just below the boiling point of the most volatile component of the reaction mixture which is generally the polyol. However, temperatures in excess of the boiling point of the most volatile constituent may be employed if the reaction vessel has been equipped with a steam-heated reflux condenser, which permits water of esterification to escape from the reaction vessel while condensing volatilized reaction components and returning them to the reaction sphere.

In preparing polyester resinous compositions from the modified unsaturated polyesters, they are combined with a polymerizable, ethylenically unsaturated monomeric crosslinking agent containing a $CH_2=C<$ group and desirably having a boiling point, at atmospheric pressure of 60° C. or greater.

Among such polymerizable compounds there are included styrene, side chain substituted styrenes such as the $\alpha$-methyl styrene, $\alpha$-ethyl styrene, and the like, ring substituted styrenes, such as alkyl styrenes, e.g., ortho-, meta and para-alkyl styrenes, e.g., o-methyl styrene, p-ethyl styrene, meta-propyl styrene, 2,4-dimethyl styrene, 2,5-diethyl styrene, and the like, halostyrenes, e.g., o-bromostyrene, p-chlorostyrene, 2,4-dichlorostyrene, and the like. Alkyl esters of acrylic and methacrylic acid, e.g., methyl, ethyl or butyl acrylate, methyl methacrylate, and the like, may also be employed. In addition, one may also use aliphatic vinyl esters such as vinyl acetate, vinyl butyrate, vinyl laurate, acrylonitrile, methacrylonitrile, vinyl chloride, and the like. Further, acrylamide, methacrylamide and their derivatives may be employed. Still further, one can make use of the allyl compounds such as diallyl phthalate, allyl acetate, allyl methacrylate, diallyl carbonate, allyl lactate, allyl $\alpha$-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetraalyl silane, tetraalyl silicate, hexallyldisiloxane and the like. These polymerizable, ethylenically unsaturated monomeric cross-linking agents may be used singly or in combination with one another.

The ratio of the unsaturated polyester to the monomeric crosslinking agent may be varied over a wide range and, therefore, this ratio is not critical. For example, the unsaturated reactive resin content may range from about 10 to about 90% of the total weight of this copolymerizable mixture. For most purposes, however, the polyester resinous compositions will comprise from about 30 to 60 parts of the unsaturated resin and correspondingly from about 70 to 40 parts of the polymerizable monomer.

In order to facilitate the copolymerization of the monomeric cross-linking agent with the reactive resin, it is preferred that a polymerization catalyst be incorporated in the composition at the time of its curing. The type and amounts of these catalytic materials which may be used are well known in the art, and any material which normally induces polymerization of polyester resinous compositions can be utilized. The optimum reaction conditions are modified to some extent by the choice of the particular catalyst used in the process. A very active catalyst should be used in lower concentrations, and preferably at lower temperatures, than a less reactive material. The catalysts that are preferably employed comprise a wide variety of organic superoxides, i.e., organic peroxides ("acidic peroxides") and hydroperoxides ("alcoholic peroxides"). Mixtures of peroxides and hydroperoxides, including commercially available mixtures such as methyl ethyl ketone peroxide, cyclohexanone peroxide, and the like, are especially effective as catalysts. Among the organic peroxide catalysts that may be employed are such as acetyl peroxide, benzoyl peroxide, substituted benzoyl peroxides, and particularly halogenated benzoyl peroxides such as p-beomobenzoyl peroxide, 2,4-dichlorobenzoyl peroxide, etc., benzoyl acetyl peroxide, phthalyl peroxide succinyl peroxide, fatty oil acid peroxides, such as coconut oil peroxide, lauryl peroxide, stearyl peroxide, oleyl peroxide, anisoyl peroxide, toluyl peroxide, and the like. Organic peracids, such as peracetic acid and perbenzoic acid, may also be employed. Among the organic hydroperoxide catalysts that may be employed are such as tertiary butyl hydroperoxide, cumene hydroperoxide, diisopropyl benzene hydroperoxide, 1-hydroxycyclohexyl hydroperoxide, the terpene oxides, such as ascaridole, 1-p-methane hydroperoxide, etc., and the like. Various other types of polymerization catalyst may also be employed, for example, compounds such as aluminum chloride, stannic chloride, boron trifluoride, or the azo-type catalysts such as $\alpha,\alpha'$-azobisisobutyronitrile.

Since the polyester constituents of the resinous compositions mentioned above may contain a high degree of polymerizable unsaturation, it may be desirable to incorporate a polymerization inhibitor therewith. The inhibitor, i.e., a material whose primary function is to retard internal polymerization of the polyester constituent of the resinous composition, effects stabilization of the composition during any storage period encountered prior to curing. However, once the resinous composition is contacted with a sufficient amount of a polymerization catalyst, the effect of the inhibitor will be overcome. Among the inhibitors that may be used are such as phenol; the monoalkyl phenols, such as ortho-, meta-, and para-cresol as well as mixtures of such isomers; polyalkyl phenols having a plurality of the same or different substituents, e.g., ethyl, propyl, butyl, and higher alkyl radicals attached to their nuclei; catechol, tertiary butyl catechol, hydroquinone, tertiary butyl hydroquinone, resorcinol, eugenol guaiacol, pyrogallol, benzaldehyde, tannic acid, ascorbic acid, isoascorbic acid, phenylene diamine, sym-di-$\beta$-naphthyl-p-phenylene diamine, aniline, and the like. The amount of polymerization inhibitor employed depends on the nature of the polyester resinous composition as well as the period of storage stability required. Generally, from about 0.001% to 0.3% by weight, based on the total weight of polymerizable reactive components present, will be sufficient.

Inhibitors of this type may be added to the reactive resin during the preparation thereof or optionally added later to the compounded polyester resinous composition. In addition, other known additives may be employed such as promoters used in conjunction with the catalyst, mold lubricants, fillers and reinforcements, colorants, flow promoters, ultraviolet absorbing compounds, and the like.

The conditions necessary for curing the polyester resinous compositions of this invention do not depart from the practice ordinarily observed in curing this type of composition. They may be cured in contact with air or in enclosed molds at temperatures ranging from about 10° C. to about 160° C. or even higher as long as they are kept below the point at which the particular resinous composition employed begins to decompose. Where it is convenient, it is especially desirable to cure the resinous compositions by heating the catalyzed, resin-forming mass to between 90° C. and about 150° C. for a period of about 3 to 90 minutes.

The following examples are submitted for a better understanding of the invention.

EXAMPLE 1

This example describes the preparation of an unsaturated polyester having cinnamic acid functionality in the polymer main-chain. A one-liter flask is fitted with a stirrer, thermometer, nitrogen inlet tube and a heated Vigreaux column. The top of the Vigreaux column is also fitted with a Dean-Stark trap and cold water condensor. The flask is charged with 218.8 g of neopentyl glycol (2.1 moles), 206.1 g of para(methoxycarbonyl) cinnamic acid (1.0 mole), and 0.52 g of dibutyltin oxide. The reaction is heated for one hour at 185° C., and for three hours and 20 minutes at 195° C. During this part of the reaction, 34.2 mL of distillate is collected. The reaction is cooled to 145° C. and 98.1 g of maleic anhydride (1.0 mole) and 0.052 g of toluhydroquinone are added. The reaction is continued for one hour at 175° C., one hour at 185° C., and at 195° C. for two hours and 30 minutes. At this point, the acid number of the polymer is 23.9, and 13.4 mL of distillate is collected. The polyester is decanted from the reaction flask and cooled. The inherent viscosity is 0.092 and the number average molecular weight is 1178. The final acid number is 22.6.

EXAMPLE 2

This example describes the preparation of the control polyester, without para(methoxycarbonyl) cinnamic acid. In the same manner, 251.6 g of neopentyl glycol (2.415 moles), 191.0 g of isophthalic acid (1.15 moles) and 0.55 g of dibutyltin oxide are reacted until the theoretical amount of distillate is collected. The reaction is cooled to 145° C. and 112.8 g of maleic anhydride (1.15 moles) and 0.055 g of toluhydroquinone are added. The reaction is continued in the same manner as Example 1 until the acid number of the unsaturated polyester is 18.1. The inherent viscosity of the polymer is 0.133, and the number average molecular weight is 2640.

EXAMPLE 3

The unsaturated polyesters prepared in Examples 1 and 2 are dissolved in 40 wt. % styrene monomer and combined with 1 wt. % benzoyl peroxide. One-eighth inch thick castings are prepared by decanting each resin between glass plates separated by ⅛ in. thick spacers and sealed around three sides with a ⅛ in. thick gasket. The resins are cured by heating for two hours at 70° C., one hour at 100° C., two hours at 125° C., and one hour at 150° C. After cooling, the thermoset polyester sheets are removed and cut into flexural bars (⅛ in.×½ in.×4 in.). In a similar manner, thermoset castings of two commercially prepared unsaturated polyesters are also made. The commercial resins include a polyester prepared from propylene glycol, isophthalic acid, and maleic anhydride. The other commercial resin is a bisphenol-A-fumarate polyester.

EXAMPLE 4

This example clearly demonstrates the superior solvent resistance that the cinnamate linkage imparts to a unsaturated polyester composition. An important comparison is made in Table 1 between polyester 1, which is prepared with the cinnamate linkage, and polyester 2, which is basically the same polyester composition, but without the cinnamate linkage. Clearly, the polyester control (2) without the cinnamate function is vigorously attacked by methylene chloride and disintegrated by solvent stress fracture within four hours. On the other hand, polyester 1, prepared with the cinnamate linkage is unaffected by this powerful solvent.

EXAMPLE 5

Table 2 shows the effect of exposure of the thermoset castings in ethyl acetate at 40° C. The results show that after six days exposure, the control resin without cinnamate (2) and the commercial bisphenol-A-fumarate resin (4) had both disintegrated. After nine days exposure, all samples except the cinnamate-based composition (1) have disintegrated. After this nine-day exposure test, the cinnamate-based polyester composition (1) is visually unaffected by this powerful organic solvent.

EXAMPLE 6

The results presented in Table 3 clearly show the enhanced solvent resistance of the unsaturated polyester composition prepared with the cinnamate linkage (1). This sample shows no obvious change in appearance after contact with trichloroethylene at 40° C. for three days, and retained nearly 82% of its initial flexural strength. On the other hand, vigorous solvent attack occurs on the polyester control (2) as well as on the two commercial polyesters (3) and (4). These samples disintegrate within three days.

EXAMPLE 7

Table 4 shows the results of the toluene exposure tests at 40° C. In this aromatic solvent, the commercial resin (3), and the unsaturated polyester prepared with the cinnamate linkage both show high retention of flexural strength after 18 days. However, the polyester control composition (2), without the cinnamate linkage, disintegrates before completion of the 18-day exposure. The commercial bisphenol-A-fumarate polyester (4) loses nearly half of its initial flexural strength after the 18-day test.

Unsaturated polyesters prepared with the cinnamate linkage in the polymer main-chain show exceptional resistance to attack by a variety of aggressive organic solvents. This result is surprising and unexpected in view of the generally poor solvent resistance properties noted for most unsaturated polyester compositions and commercially available resins. The discovery of a solvent-resistant crosslinkable matrix polymer represents a potentially important innovation with broad application for the fabrication of tanks and pipes for use in the chemical process industry, oil and gas industry, and waste treatment markets.

In Examples 8 through 95, the following polyester compositions are used:

| Designation | Polyester Compositions |
|---|---|
| A | Neopentyl glycol, p-(Methoxy Carbonyl)-Cinnamic Acid Maleic Anhydride (1:1) |
| B | Neopentyl glycol, Isophthalic Acid/ Maleic Anhydride (1:1) |
| C | 1,2-Propanediol, Isophthalic Acid/ Maleic Anhydride (Commercial) |
| D | Bisphenol-A, Fumaric Acid (Commercial) |
| E | 1,2-Propanediol, p-(Methoxy Carbonyl)-Cinnamic Acid Maleic Anhydride (1:1) |
| F | 1,2-Propanediol, Isophthalic Acid/ p-(Methoxy carbonyl)-Cinnamic Acid/ Fumaric Acid (25:25:50) |
| G | 1,4-Cyclohexanedimethanol, Isophthalic Acid/ Maleic Anhydride (1:1) |
| H | 1,4-Cyclohexanedimethanol, p-(Methoxy Carbonyl)-Cinnamic Acid/ Maleic Anhydride (1:1) |
| I | 1,4-Cyclohexanedimethanol, Isophthalic Acid/ P-(Methoxy Carbonyl)-Cinnamic Acid/ Maleic Anhydride (25:25:50) |
| J | Neopentyl Glycol, Isophthalic Acid/ p-(Methoxy Carbonyl)-Cinnamic Acid/ Maleic Anhydride (25:25:50) |
| K | 2,2,4-Trimethylpentane-1,3-diol, Isophthalic Acid/ Fumaric Acid (1:1) |
| L | 2,2,4-Trimethylpentane-1,3-diol, p(Methoxy Carbonyl)- |
| M | Cinnamic Acid/ Fummaric Anhydride (1:1) |
| N | Neopentyl Glycol, Phthalic Anhydride/ Fumaric Anhydride (1:1) |
| O | Neopentyl Glycol, Phthalic Anhydride/ p-(Methoxy Carbonyl)-Cinnamic Acid, Fumaric Anhydride |
| P | Neopentyl Glycol, Isophthalic Acid/ Fumaric Anhydride (1:1) |
| Q | Neopentyl Glycol, Isophthalic Acid/ p-(Methoxy Carbonyl)-Cinnamic Acid/ Fumaric Acid (25:25:50) |
| R | Neopentyl Glycol, Dimethyl Terephthalate/ Dicarboxylate/ Fumaric Acid (1:1) |
| S | Neopentyl Glycol, Dimethyl Terephthalate/ p-(Methoxy Carbonyl)-Cinnamic Acid/ Fumaric Acid |
| T | Neopentyl Glycol, Cis-Trans-1,4-Dimethylcyclohexanedicarboxylate/ Fumaric Acid (1:1) |
| U | Neopentyl Glycol, Cis-Trans-1,4-Dimethylcyclohexanedicarboxylate/ p-(Methoxy Carbonyl)-Cinnamic Acid, Fumaric Acid (25:25:50) |
| V | Neopentyl Glycol, Trans-1,4-Dimethyl-cyclohexanedicarboxylate/ Fumaric Acid |
|   | Neopentylk Glycol Trans-1,4-Dimethyl-cyclohexanedicarboxylate/ p-(Methoxy Carbonyl)-Cinnamic Acid, Fumaric Acid (25:25:50) |

TABLE 1

SOLVENT-RESISTANCE TEST IN METHYLENE CHLORIDE AT ROOM TEMPERATURE

| | | | After 2 Hrs. Exposure | | After 4 Hrs. Exposure | | After 6 Hrs. Exposure | |
|---|---|---|---|---|---|---|---|---|
| Ex. | Poly. Comp. | Initial Flexural Strength ($\times 10^3$ psi) | Flexural Strength ($\times 10^3$ psi) | % Reten. of Flexural Strength | Flexural Strength ($\times 10^3$ psi) | % Reten. of Flexural Strength | Flexural Strength ($\times 10^3$ psi) | % Reten. of Flexural Strength |
| 8 | A | 11.91 | 10.20 | 85.6 | 10.80 | 90.7 | 9.66 | 81.1 |
| 9 | B | 18.46 | 10.83 | 58.7 | D | O | D | O |
| 10 | C | 18.60 | 12.40 | 66.7 | 11.64 | 62.6 | 9.82 | 52.7 |
| 11 | D | 16.85 | N.A. | — | — | — | 3.79 | 22.5 |

Dis. Sample Disintegrated

TABLE 2

SOLVENT-RESISTANCE TEST IN ETHYL ACETATE AT 40° C.

| | | | After 3 Days Exposure | | After 6 Days Exposure | | After 9 Days Exposure | |
|---|---|---|---|---|---|---|---|---|
| Ex. | Poly. Comp. | Initial Flexural Strength ($\times 10^3$ psi) | Flexural Strength ($\times 10^3$ psi) | % Reten. of Flexural Strength | Flexural Strength ($\times 10^3$ psi) | % Reten. of Flexural Strength | Flexural Strength ($\times 10^3$ psi) | % Reten. of Flexural Strength |
| 12 | A | 11.91 | 10.11 | 84.9 | 8.88 | 74.6 | 7.17 | 60.2 |
| 13 | B | 18.46 | 2.73 | 14.8 | Dis. | O | D | O |
| 14 | C | 18.60 | 15.82 | 85.0 | 11.92 | 64.1 | D | O |

TABLE 2-continued

SOLVENT-RESISTANCE TEST IN ETHYL ACETATE AT 40° C.

| Ex. | Poly. Comp. | Initial Flexural Strength (× 10³ psi) | After 3 Days Exposure Flexural Strength (× 10³ psi) | % Reten. of Flexural Strength | After 6 Days Exposure Flexural Strength (× 10³ psi) | % Reten. of Flexural Strength | After 9 Days Exposure Flexural Strength (× 10³ psi) | % Reten. of Flexural Strength |
|---|---|---|---|---|---|---|---|---|
| 15 | D | 16.85 | 8.61 | 51.1 | Dis. | 0 | D | 0 |

Dis. Sample Disintegrated

TABLE 3

SOLVENT-RESISTANCE TEST IN TRICHLOROETHYLENE AT 40° C.

| Ex. | Poly. Comp. | Initial Flexural Strength (× 10³ psi) | After 3 Days Exposure Flexural Strength (× 10³ psi) | % Reten. of Flexural Strength |
|---|---|---|---|---|
| 16 | A | 11.91 | 9.72 | 81.6 |
| 17 | B | 18.46 | Dis. | 0 |
| 18 | C | 18.60 | Dis. | 0 |
| 19 | D | 16.85 | Dis. | 0 |

Dis. Samples Disintegrated

TABLE 4

SOLVENT-RESISTANCE TEST IN TOLUENE AT 40° C.

| Ex. | Poly. Comp. | Initial Flexural Strength (× 10³ psi) | After 3 Days Exposure Flexural Strength (× 10³ psi) | % Reten. of Flexural Strength | After 18 Day Exposure Flexural Strength (× 10³ psi) | % Reten. of Flexural Strength |
|---|---|---|---|---|---|---|
| 20 | A | 11.91 | 12.72 | 106.8 | 10.90 | 91.5 |
| 21 | B | 18.46 | 11.85 | 64.2 | Dis. | 0 |
| 22 | C | 18.60 | 17.71 | 95.2 | 18.09 | 97.2 |
| 23 | D | 16.85 | 13.89 | 82.4 | 9.72 | 57.7 |

Dis. Sample Disintegrated

TABLE 5

PHYSICAL PROPERTIES OF SELECTED UNSATURATED POLYESTER COMPOSITIONS

| | | Resin Properties | | | Thermoset Casting Properties* | | | | |
|---|---|---|---|---|---|---|---|---|---|
| Ex. | Resin Composition | Mole. Wt. | Acid No. | IV (PTCE) | Flexural Strength (× 10³ psi) | Flexural Modulus (× 10³ psi) | Tensile Strength (× 10³ psi) | Elong. To Break % | Unnotched Izod (Ft.-Lb/In) |
| 24 | C | 1912 | 23 | 0.107 | 15.48 | 6.03 | 1.14 | 1 | 2.03 |
| 25 | E | 968 | 31 | 0.083 | 10.90 | 5.35 | 0.92 | 2 | 0.94 |
| 26 | F | 1878 | 26 | 0.139 | 13.85 | 5.32 | 2.07 | 3 | 1.37 |
| 27 | G | 2843 | 20 | 0.167 | 18.96 | 4.80 | 10.24 | 8 | 3.43 |
| 28 | H | 1344 | 12 | 0.124 | 12.89 | 4.57 | 0.71 | 1 | 1.99 |
| 29 | I | 2278 | 20 | 0.179 | 17.85 | 4.22 | 3.88 | 4 | 2.69 |
| 30 | B | 2640 | 17 | 0.133 | 18.46 | 5.74 | 7.46 | 8 | 2.90 |
| 31 | A | 1107 | 21 | 0.087 | 13.05 | 5.21 | 0.91 | 2 | 1.00 |
| 32 | J | 1981 | 26 | 0.125 | 13.99 | 5.37 | 2.96 | 3 | 1.03 |
| 33 | K | 2071 | 29 | 0.096 | 11.45 | 4.88 | 1.67 | 2 | 1.96 |
| 34 | L | 922 | 19 | 0.063 | 9.13 | 4.75 | 0.51 | 1 | 0.57 |

*Thermoset Castings:
40% Styrene/60% Polyester Resin Cured with 1% Benzoyl Peroxide for
2 Hours at 70° C.
1 Hour at 100° C.
2 Hours at 125° C.
1 Hour at 150° C.

TABLE 6

SOLVENT-RESISTANCE OF SELECTED UNSATURATED POLYESTER COMPOSITIONS

Methylene Chloride Exposure at Room Temperature*

| Ex. | Resin Comp. | Initial Flexural Strength (× 10³ psi) | 3 Hours in CH Cl Flexural Strength (× 10³ psi) | % Reten. of Flexural Strength | 6 Hours in CH Cl Flexural Strength (× 10³ psi) | % Reten. of Flexural Strength | 15 Hours in CH Cl Flexural Strength (× 10³ psi) | % Reten. of Flexural Strength |
|---|---|---|---|---|---|---|---|---|
| 35 | C | 15.48 | 17.97 | 116.1 | 11.15 | 72.0 | 8.65 | 55.9 |
| 36 | E | 10.90 | 7.73 | 70.9 | 5.09 | 46.7 | 5.49 | 50.4 |
| 37 | F | 13.85 | — | — | — | — | 9.95 | 71.8 |
| 38 | G | 18.96 | 0.94 | 5.0 | DISINTEGRATED | | | |

TABLE 6-continued

SOLVENT-RESISTANCE OF SELECTED UNSATURATED POLYESTER COMPOSITIONS

Methylene Chloride Exposure at Room Temperature*

| Ex. | Resin Comp. | Initial Flexural Strength ($\times 10^3$ psi) | 3 Hours in CH Cl Flexural Strength ($\times 10^3$ psi) | % Reten. of Flexural Strength | 6 Hours in CH Cl Flexural Strength ($\times 10^3$ psi) | % Reten. of Flexural Strength | 15 Hours in CH Cl Flexural Strength ($\times 10^3$ psi) | % Reten. of Flexural Strength |
|---|---|---|---|---|---|---|---|---|
| 39 | H | 12.89 | 11.49 | 89.1 | 9.62 | 74.6 | 5.75 | 44.6 |
| 40 | I | 17.85 | 8.37 | 46.9 | 7.88 | 44.1 | DISINTEGRATED | |
| 41 | B | 18.46 | 10.83 (2 hrs.) | 58.7 | DISINTEGRATED | | | |
| 42 | A | 13.05 | 7.55 | 57.9 | 9.13 | 70.0 | 5.36 | 41.1 |
| 43 | J | 13.99 | 13.48 | 96.4 | 11.14 | 79.6 | 10.21 | 73.0 |
| 44 | K | 11.45 | 2.94 | 25.7 | DISINTEGRATED | | | |
| 45 | L | 9.13 | 2.77 | 30.3 | 2.09 | 22.9 | DISINTEGRATED | |
| Commercial Controls | | | | | | | | |
| 46 | Comm. | 19.12 | 8.21 | 42.9 | 4.38 | 22.9 | DISINTEGRATED | |
| 47 | Comm. | 17.71 | 8.04 | 45.4 | 4.05 | 22.9 | DISINTEGRATED | |
| 48 | Comm. | 18.12 | 10.74 | 59.3 | 8.94 | 49.3 | 7.59 | 41.9 |
| 49 | Comm. | 15.57 | 8.95 | 57.5 | 5.54 | 35.6 | DISINTEGRATED | |

*Flexural Bars Removed from Solvent Test, Dried in Vacuum Oven Overnight and Flexural Strength Determined.

TABLE 7

SOLVENT-RESISTANCE OF THERMOSET POLYESTER COMPOSITIONS

Toluene at 60° C.

| Ex. | Resin Comp. | Initial Flexural Strength ($\times 10^3$ psi) | 5 Days Exposure Flexural Strength ($\times 10^3$ psi) | % Reten. of Flexural Strength | 26 Days Exposure Flexural Strength ($\times 10^3$ psi) | % Reten. of Flexural Strength | 56 Days Exposure Flexural Strength ($\times 10^3$ psi) | % Reten. of Flexural Strength |
|---|---|---|---|---|---|---|---|---|
| 50 | M | 15.99 | 12.04 | 75.3 | DISINTEGRATED | | | |
| 51 | N | 14.49 | — | | 6.58 | 45.4 | DISINTEGRATED | |
| 52 | O | 17.01 | 12.78 | 75.1 | DISINTEGRATED | | | |
| 53 | P | 13.99 | — | | 9.42 | 67.3 | DISINTEGRATED | |
| 54 | Q | 18.10 | 8.98 | 49.6 | DISINTEGRATED | | | |
| 55 | R | 12.13 | 10.89 | 89.8 | 8.23 | 67.8 | DISINTEGRATED | |
| 56 | S | 16.36 | — | | DISINTEGRATED | | | |
| 57 | T | 12.59 | — | | DISINTEGRATED | | | |
| 58 | U | | DID NOT DISSOLVE IN STYRENE | | | | | |
| 59 | V | 10.66 | — | | DISINTEGRATED | | | |
| Commercial Controls | | | | | | | | |
| 60 | Comm. | 19.12 | | | DISINTEGRATED | | | |
| 61 | Comm. | 17.71 | | | DISINTEGRATED | | | |
| 62 | Comm. | 18.12 | 12.26 | 67.6 | 10.41 | 57.4 | 9.69 | 53.5 |
| 63 | Comm. | 15.57 | | | DISINTEGRATED | | | |

TABLE 8

SOLVENT-RESISTANCE OF THERMOSET POLYESTER COMPOSITIONS

Trichloroethylene at 50° C.

| Ex. | Resin Comp. | Initial Flexural Strength ($\times 10^3$ psi) | 1 Day Exposure Flexural Strength ($\times 10^3$ psi) | % Reten. of Flexural Strength | 2 Days Exposure Flexural Strength ($\times 10^3$ psi) | % Reten. of Flexural Strength | 8 Days Exposure Flexural Strength ($\times 10^3$ psi) | % Reten. of Flexural Strength |
|---|---|---|---|---|---|---|---|---|
| 54 | M | 15.99 | 10.39 | 64.9 | 6.79 | 42.5 | DISINTEGRATED | |
| 55 | N | 14.49 | — | | 12.50 | 86.3 | DISINTEGRATED | |
| 56 | O | 17.01 | 11.50 | 67.6 | 7.36 | 43.3 | DISINTEGRATED | |
| 57 | P | 13.99 | — | | 11.13 | 79.6 | 5.60 | 40.0 |
| 58 | Q | 18.10 | 8.78 | 48.5 | DISINTEGRATED | | | |
| 59 | R | 12.13 | 11.57 | 95.4 | 11.12 | 91.7 | 8.75 | 72.1 |
| 60 | S | 16.36 | — | | DISINTEGRATED | | | |
| 61 | T | 12.59 | — | | 5.87 | 46.6 | DISINTEGRATED | |
| 62 | U | | DID NOT DISSOLVE IN STYRENE | | | | | |
| 63 | V | 10.66 | — | | DISINTEGRATED | | | |
| Commercial Controls | | | | | | | | |
| 64 | Comm. | 19.12 | 4.61 | 24.1 | DISINTEGRATED | | | |
| 65 | Comm. | 17.71 | | | DISINTEGRATED | | | |
| 66 | Comm | 18.12 | 12.56 | 69.3 | 12.08 | 55.6 | 9.34 | 51.5 |
| 67 | Comm. | 15.57 | 8.57 | 55.0 | DISINTEGRATED | | | |

TABLE 9
SOLVENT-RESISTANCE OF THERMOSET POLYESTER COMPOSITIONS
Ethyl Acetate at 50° C.

| Ex. | Resin Comp. | Initial Flexural Strength (× 10³ psi) | 2 Days Exposure Flexural Strength (× 10³ psi) | % Reten. of Flexural Strength | 4 Days Exposure Flexural Strength (× 10³ psi) | % Reten. of Flexural Strength | 11 Days Exposure Flexural Strength (× 10³ psi) | % Reten. of Flexural Strength |
|---|---|---|---|---|---|---|---|---|
| 68 | M | 15.99 | 11.72 | 73.3 | 4.88 | 30.5 | DISINTEGRATED | |
| 69 | N | 14.49 | — | | — | | 6.78 | 46.8 |
| 70 | O | 17.01 | 13.23 | 77.8 | 6.63 | 38.9 | DISINTEGRATED | |
| 71 | P | 13.99 | — | | 11.84 | 84.6 | 7.73 | 55.3 |
| 72 | Q | 18.10 | 10.06 | 55.6 | 5.62 | 31.0 | DISINTEGRATED | |
| 73 | R | 12.13 | 12.24 | 100.9 | 9.48 | 78.2 | 7.96 | 65.6 |
| 74 | S | 16.36 | — | | DISINTEGRATED | | | |
| 75 | T | 12.59 | — | | — | | 5.43 | 43.1 |
| 76 | U | | DID NOT DISSOLVE IN STYRENE | | | | | |
| 77 | V | 10.66 | 4.85 | 45.5 | DISINTEGRATED | | | |
| Commercial Controls | | | | | | | | |
| 78 | Comm. | 19.12 | 9.06 | 47.4 | DISINTEGRATED | | | |
| 79 | Comm. | 17.71 | | | DISINTEGRATED | | | |
| 80 | Comm. | 18.12 | 8.97 | 49.5 | 6.70 | 36.9 | 6.58 | 36.3 |
| 81 | Comm. | 15.57 | | | DISINTEGRATED | | | |

TABLE 10
SOLVENT-RESISTANCE OF THERMOSET POLYESTER COMPOSITIONS
METHYLENE CHLORIDE AT ROOM TEMPERATURE

| Ex. | Resin Comp. | Initial Flexural Strength (× 10³ psi) | 3 Hours Exposure Flexural Strength (× 10³ psi) | % Reten. of Flexural Strength | 6 Hours Exposure Flexural Strength (× 10³ psi) | % Reten. of Flexural Strength | 15 Hours Exposure Flexural Strength (× 10³ psi) | % Reten. of Flexural Strength |
|---|---|---|---|---|---|---|---|---|
| 82 | M | 15.99 | 13.29 | 83.1 | 8.79 | 54.9 | 5.40 | 33.8 |
| 83 | N | 14.49 | 12.51 | 86.3 | 12.14 | 83.8 | 9.75 | 67.3 |
| 84 | O | 17.01 | 12.34 | 72.5 | 7.54 | 44.3 | 4.53 | 26.5 |
| 85 | P | 13.99 | 13.48 | 96.4 | 11.14 | 79.6 | 10.21 | 73.0 |
| 86 | Q | 18.10 | 12.79 | 70.7 | 9.14 | 50.5 | 7.26 | 40.1 |
| 87 | R | 12.13 | 10.96 | 90.4 | 11.71 | 96.5 | 8.50 | 70.1 |
| 88 | S | 16.36 | 8.39 | 51.3 | 4.70 | 28.7 | DISINTEGRATED | |
| 89 | T | 12.59 | 12.09 | 96.0 | 8.53 | 67.8 | 5.27 | 41.9 |
| 90 | U | | DID NOT DISSOLVE IN STYRENE | | | | | |
| 91 | V | 10.66 | 6.07 | 56.9 | 4.64 | 43.5 | 3.21 | 30.1 |
| Commercial Controls | | | | | | | | |
| 92 | Comm. | 19.12 | 8.21 | 42.9 | 4.38 | 22.9 | DISINTEGRATED | |
| 93 | Comm. | 17.71 | 8.04 | 45.4 | 4.05 | 22.9 | DISINTEGRATED | |
| 94 | Comm. | 18.12 | 10.74 | 59.3 | 8.94 | 49.3 | 7.59 | 41.9 |
| 95 | Comm. | 15.57 | 8.95 | 57.5 | 5.54 | 35.6 | DISINTEGRATED | |

In the preceding examples, one-eighth inch thick thermoset casting sheets are prepared and cut into flexural bars (4 in. × ½ in. × ⅛ in.) for evaluation of physical properties and for solvent resistance tests. Solvent resistance tests are performed by placing the thermoset flexural bars in the appropriate organic solvents at selected temperatures. After the desired contact time, the bars are removed from the solvents and the flexural strength is determined. The percent retention of flexural strength is calculated as the ratio of flexural strength after solvent exposure to the flexural strength before solvent exposure.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. Composition comprising a polyester derived from 100 mole % of an acid component and 100 mole % of a glycol component, said acid component comprising about 30-90 mole % of at least one α,β-ethylenically unsaturated dicarboxylic acid and about 70-10 mole % of a compound containing a cinnamic acid moiety, and said glycol component comprising at least one saturated aliphatic glycol containing from 2 to 10 carbon atoms.

2. Composition according to claim 1 wherein said polyester is derived from about 40-60 mole % of a compound containing a cinnamic acid moiety.

3. Composition according to claim 1 wherein said compound containing a cinnamic acid moiety is 4-(2-carboxyethenyl)benzoic acid or 3,3'-(1,4-phenylene)-bis[2-propenoic acid].

4. Composition according to claim 2 wherein said compound containing a cinnamic acid moiety is 4-(2-carboxyethenyl)benzoic acid or 3,3'-(1,4-phenylene)-bis[2-propenoic acid].

5. Composition according to claim 1 wherein said α,β-ethylenically unsaturated dicarboxylic acid contains 4 to 8 carbon atoms.

6. Composition according to claim 1 wherein said α,β-ethylenically unsaturated dicarboxylic acid is maleic or fumaric.

7. Composition according to claim 1 wherein said glycol contains 2-10 carbon atoms.

8. Composition according to claim 1 wherein said glycol is neopentyl glycol or 1,2-propanediol.

9. Composition comprising a polyester derived from 100 mole % of an acid component and 100 mole % of a glycol component, said acid component comprising about 40–60 mole % of at least one $\alpha,\beta$-ethylenically unsaturated dicarboxylic acid having 2–12 carbon atoms and about 60–40 mole % of a compound containing a cinnamic acid moiety selected from 4-(2-carboxyethenyl)benzoic acid or 3,3'-(1,4-phenylene)bis[2-propenoic acid], and said glycol comprising at least one saturated aliphatic glycol containing from 2 to 10 carbon atoms.

10. Molding composition comprising the polymer composition of claim 1 combined with from about 10 to about 90%, based on the weight of the mixture, of an ethylenically unsaturated monomeric crosslinking agent.

11. Molding composition according to claim 9 wherein said crosslinking agent is styrene or substituted styrene.

12. Molding composition comprising the polymer composition of claim 9 combined with from about 10 to about 90%, based on the weight of the mixture, of an ethylenically unsaturated monomeric crosslinking agent.

13. Molding composition according to claim 9 wherein said crosslinking agent is styrene or substituted styrene.

14. An article of manufacture comprising the reaction product of the molding composition of claim 10.

15. An article of manufacture comprising the reaction product of the molding composition of claim 12.

* * * * *